(12) United States Patent
Lee et al.

(10) Patent No.: US 11,487,410 B2
(45) Date of Patent: Nov. 1, 2022

(54) ELECTRONIC DEVICE AND OPERATION METHOD THEREFOR

(71) Applicant: Samsung Electronics Co., Ltd., Gyeonggi-do (KR)

(72) Inventors: Chaekyung Lee, Gyeonggi-do (KR); Hyun Kim, Gyeonggi-do (KR); Joonwon Park, Gyeonggi-do (KR); Hyunjin Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 36 days.

(21) Appl. No.: 16/963,416

(22) PCT Filed: Jan. 18, 2019

(86) PCT No.: PCT/KR2019/000744
§ 371 (c)(1),
(2) Date: Jul. 20, 2020

(87) PCT Pub. No.: WO2019/143169
PCT Pub. Date: Jul. 25, 2019

(65) Prior Publication Data
US 2020/0341618 A1 Oct. 29, 2020

(30) Foreign Application Priority Data

Jan. 18, 2018 (KR) .................. 10-2018-0006518

(51) Int. Cl.
*G06F 3/04842* (2022.01)
*G06F 3/04817* (2022.01)
(Continued)

(52) U.S. Cl.
CPC ...... *G06F 3/04842* (2013.01); *G06F 3/04817* (2013.01); *G06Q 20/32* (2013.01); *G06Q 20/34* (2013.01)

(58) Field of Classification Search
CPC ............ G06F 3/04842; G06F 3/04817; G06F 3/04886; G06F 3/04883; G06Q 20/34;
(Continued)

(56) References Cited

U.S. PATENT DOCUMENTS 10,032,100 B2 * 7/2018 Mullen ............. G06K 7/10297
2014/0351130 A1 * 11/2014 Cheek ................... G06Q 20/29
705/44
(Continued)

FOREIGN PATENT DOCUMENTS

JP 2016139263 8/2016
KR 1020110108700 10/2011
(Continued)

OTHER PUBLICATIONS

European Search Report dated Feb. 2, 2021 issued in counterpart application No. 19741813.0-1213, 8 pages.
(Continued)

*Primary Examiner* — Tuyetlien T Tran
(74) *Attorney, Agent, or Firm* — The Farrell Law Firm, P.C.

(57) ABSTRACT

An electronic device and its operating method according to various embodiments, may detect information related to an electronic card, based on a preset condition, display a graphic user interface to include a first area displaying the electronic card and a second area displaying an icon associated with the information around the first are, detect selection of the icon in the second area, and display the information in the first area.

18 Claims, 11 Drawing Sheets

(51) Int. Cl.
*G06Q 20/34* (2012.01)
*G06Q 20/32* (2012.01)

(58) Field of Classification Search
CPC .......... G06Q 20/3274; G06Q 30/0207; G06Q 20/3223; G06Q 20/353; G06Q 20/356; G07F 7/0846; H04M 1/72403
See application file for complete search history.

(56) References Cited

U.S. PATENT DOCUMENTS

| | | | |
|---|---|---|---|
| 2015/0302396 A1* | 10/2015 | Jeon | G06Q 20/363 705/41 |
| 2016/0224966 A1* | 8/2016 | Van Os | G06Q 20/3224 |
| 2016/0224973 A1* | 8/2016 | Van Os | H04N 5/225 |
| 2016/0247144 A1* | 8/2016 | Oh | G06K 7/083 |
| 2016/0253669 A1* | 9/2016 | Yoon | G06Q 20/327 705/75 |
| 2016/0259531 A1 | 9/2016 | Cho et al. | |
| 2017/0053363 A1 | 2/2017 | Maheshwari et al. | |
| 2017/0287061 A1 | 10/2017 | Chae et al. | |
| 2017/0357972 A1* | 12/2017 | Van Os | G06Q 20/3223 |
| 2018/0330357 A1* | 11/2018 | Jang | G06Q 20/227 |
| 2019/0043038 A1* | 2/2019 | Jang | G06K 9/00671 |

FOREIGN PATENT DOCUMENTS

| | | |
|---|---|---|
| KR | 101591835 | 2/2016 |
| KR | 1020160099464 | 8/2016 |
| KR | 1020160105297 | 9/2016 |
| KR | 1020170018556 | 2/2017 |
| KR | 1020170062807 | 6/2017 |
| KR | 101771572 | 9/2017 |
| KR | 1020170112569 | 10/2017 |
| WO | WO 2017/078365 | 5/2017 |
| WO | WO 2018/004137 | 1/2018 |

OTHER PUBLICATIONS

PCT/ISA/210 Search Report issued on PCT/KR2019/000744, dated May 3, 2019, pp. 5.
PCT/ISA/237 Written Opinion issued on PCT/KR2019/000744, dated May 3, 2019, pp. 8.
Indian Examination Report dated Jan. 31, 2022 issued in counterpart application No. 202017033392, 6 pages.
Korean Office Action dated Sep. 20, 2022 issued in counterpart application No. 10-2018-0006518, 10 pages.

* cited by examiner

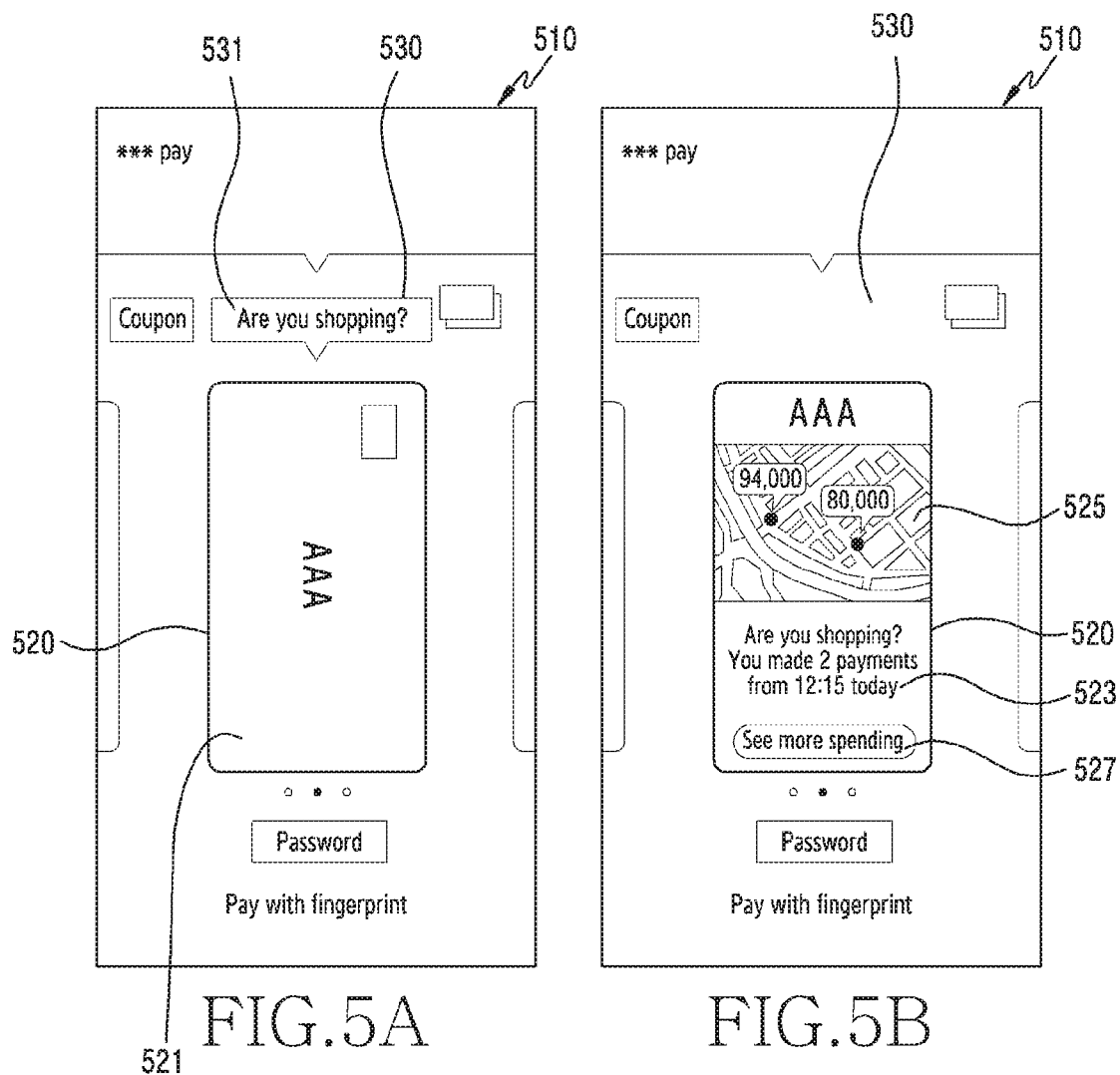

810

820 —
<
AB CAFÉ   (i)

⊙ JEJU JEJUSI VWEUP XYRO
☏ 000-1234-5678

821 —
★★★★☆
HOW WAS AB CAFÉ?

Total visits 25 times
Total payment amount ₩504,000   More >

830 —
** pay   2017.03.13. 12:30
AB CAFÉ   ₩ 18,000

** pay   2015.07.25. 11:15
AB CAFÉ   ₩ 8,000

[SMS]   2014.10.21. 10:06
AB CAFÉ   ₩ 5,000

Similar places

840 —
CD CAFÉ   DE CAFÉ   EFG CAFÉ

OPEN REVIEWS (2)

850 —
1122**   2016.10.02
Best coffee in jeju.

ABCD**   2015.01.09
Good coffee.
Have to wait at lunch time.

< WRITE REVIEW   REGISTER

⊙ AB CAFÉ
JEJU JEJUSI VWEUP XYRO ✎

Recent payment date : 2017.03.13
₩ 18,000

★★★★☆   0

Please share your experience
here with stars. it helps to
provide a better service.

If you leave your valuable review,
we'll also offer you 200p and useful
coupons for your frequently visited
place.

ADD PHOTOS

[ + ]

Open my review to public (?)   ⚬
○ **book   ○ ###gram 2016.10.02

FIG.8B

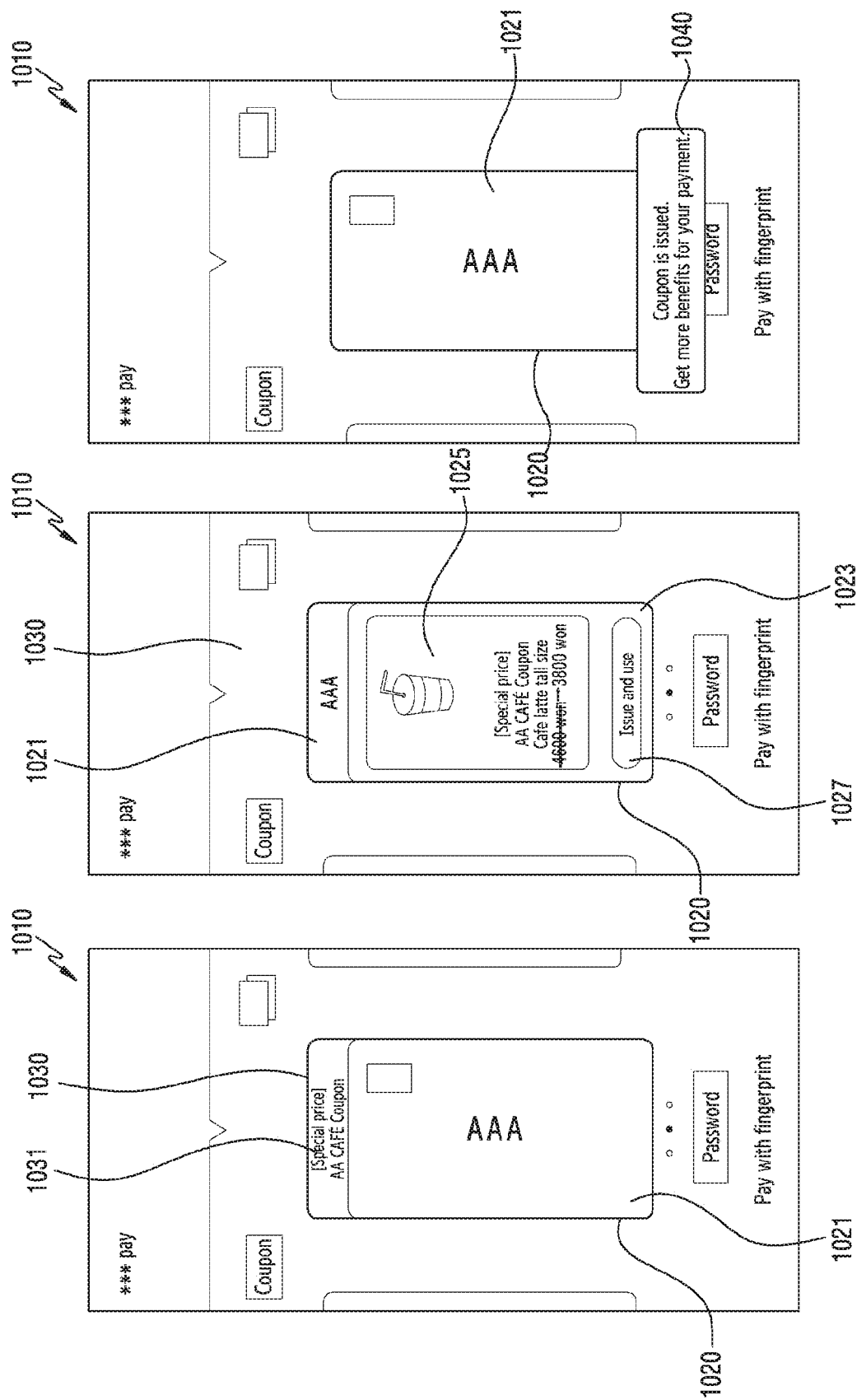

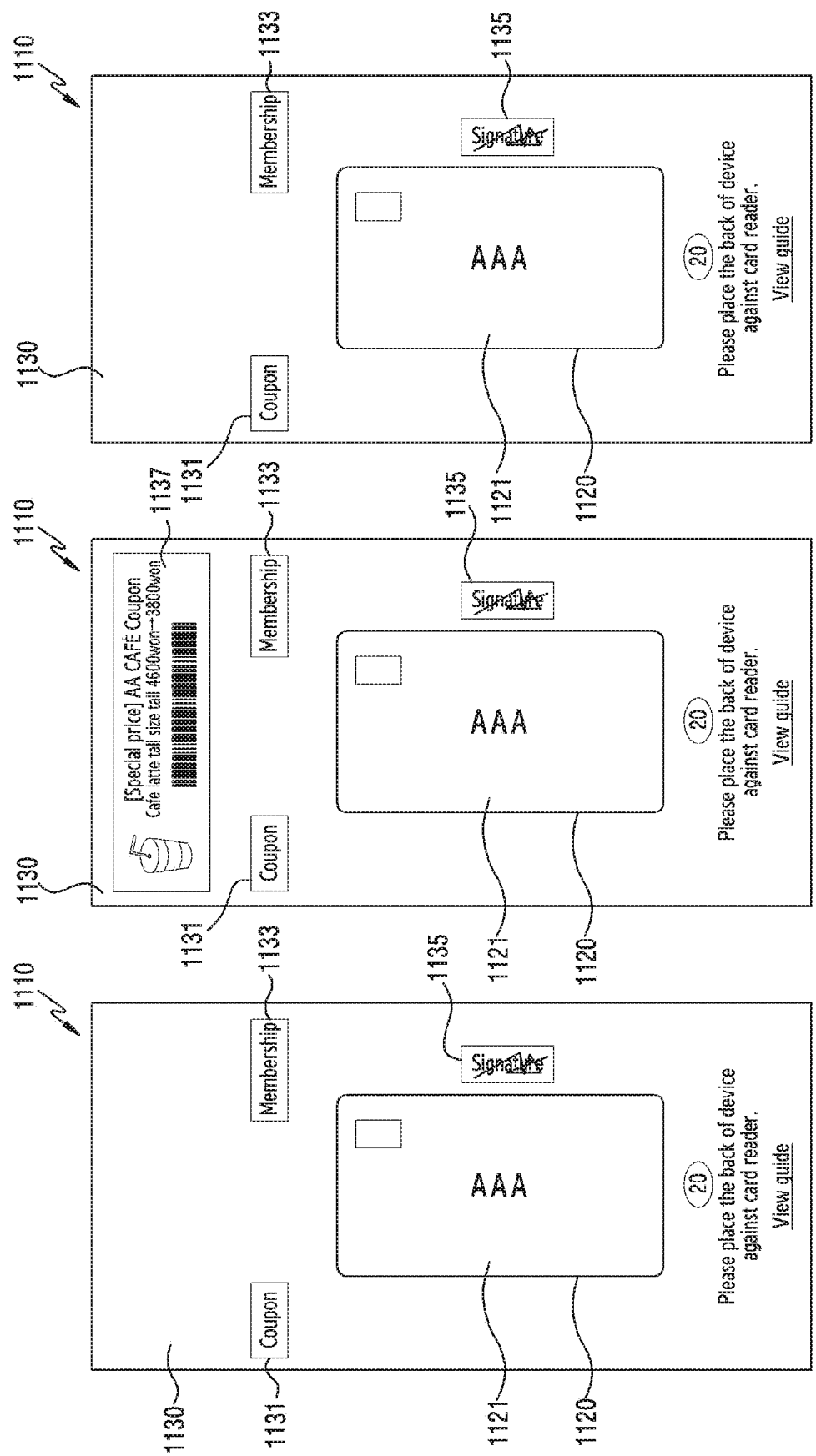

ELECTRONIC DEVICE AND OPERATION METHOD THEREFOR

PRIORITY

This application is a National Phase Entry of International Application No. PCT/KR2019/000744, which was filed on Jan. 18, 2019, and claims priority to Korean Patent Application No. 10-2018-0006518, filed in the Korean Intellectual Property Office on Jan. 18, 2018, the content of each of which is incorporated herein by reference.

TECHNICAL FIELD

Various embodiments relate to an electronic device and an operating method thereof.

BACKGROUND ART

With development of mobile communication technology, an electronic device may perform various data communication functions as well as a voice call function. The electronic device may provide various services through various applications. The electronic device may provide a multimedia service, for example, a music service, a video service, or a digital broadcast service, or a network-based communication service such as a call, wireless Internet, a short message service (SMS), or a multimedia messaging service (MMS). The electronic device evolves from a simple communication medium to a device enabling various functions such as communication, distribution, Internet, or payment, and may be used throughout a social, cultural, financial, or distribution industry.

The electronic device may provide a mobile payment service. That is, the electronic device may perform electronic payment using an electronic card. For example, using the electronic card, the electronic device may perform the electronic payment, to purchase services and goods online or offline.

DISCLOSURE OF INVENTION

Technical Problem

However, an electronic device as described above merely performs electronic payment, based on a graphic user interface associated with an electronic card. That is, for a user of the electronic device to use additional information related to the electronic card, the user of the electronic device needs to directly retrieve the additional information by operating the electronic device. At this time, the electronic device must switch a graphical user interface to display the additional information. Thus, in using an electronic device, user convenience may be lowered, and further, use efficiency of the electronic device may lowered.

Solution to Problem

An electronic device according to various embodiment, may include a display device, at least one processor operatively connected to the display device and a memory operatively connected to the processor.

According to various embodiments, the memory may store instructions for, when executed, causing the processor to detect information related to the electronic card, based on a preset condition, display a graphic user interface to include a first area displaying the electronic card and a second area displaying an icon associated with the information around the first area, detect selection of the icon in the second area, and display the information in the first area.

According to various embodiments, an operating method of an electronic device, may include detecting information related to an electronic card, based on a preset condition, displaying a graphic user interface to include a first area displaying the electronic card and a second area displaying an icon associated with the information around the first are, detecting selection of the icon in the second area and displaying the information in the first area.

Advantageous Effects of Invention

An electronic device according to various embodiments may provide additional information related to an electronic card, while displaying a graphic user interface associated with the electronic card. That is, the electronic device may detect the additional information associated with the electronic card, and thus display the additional information, without switching the graphical user interface. Hence, a user of the electronic device may easily obtain useful additional information, without directly retrieving it. Therefore, in using the electronic device, user convenience may be improved, and further, use efficiency of the electronic device may be improved.

BRIEF DESCRIPTION OF DRAWINGS

FIG. 5, FIG. 6 and FIG. 7 illustrate exemplary diagrams for explaining a guide information displaying operation according to an embodiment.

FIG. 8, FIG. 9 and FIG. 10 illustrate exemplary diagrams for explaining a guide information displaying operation according to another embodiment.

FIG. 11 illustrates exemplary diagrams for explaining an electronic payment operation in FIG. 2.

BEST MODE FOR CARRYING OUT THE INVENTION

Figure 1:
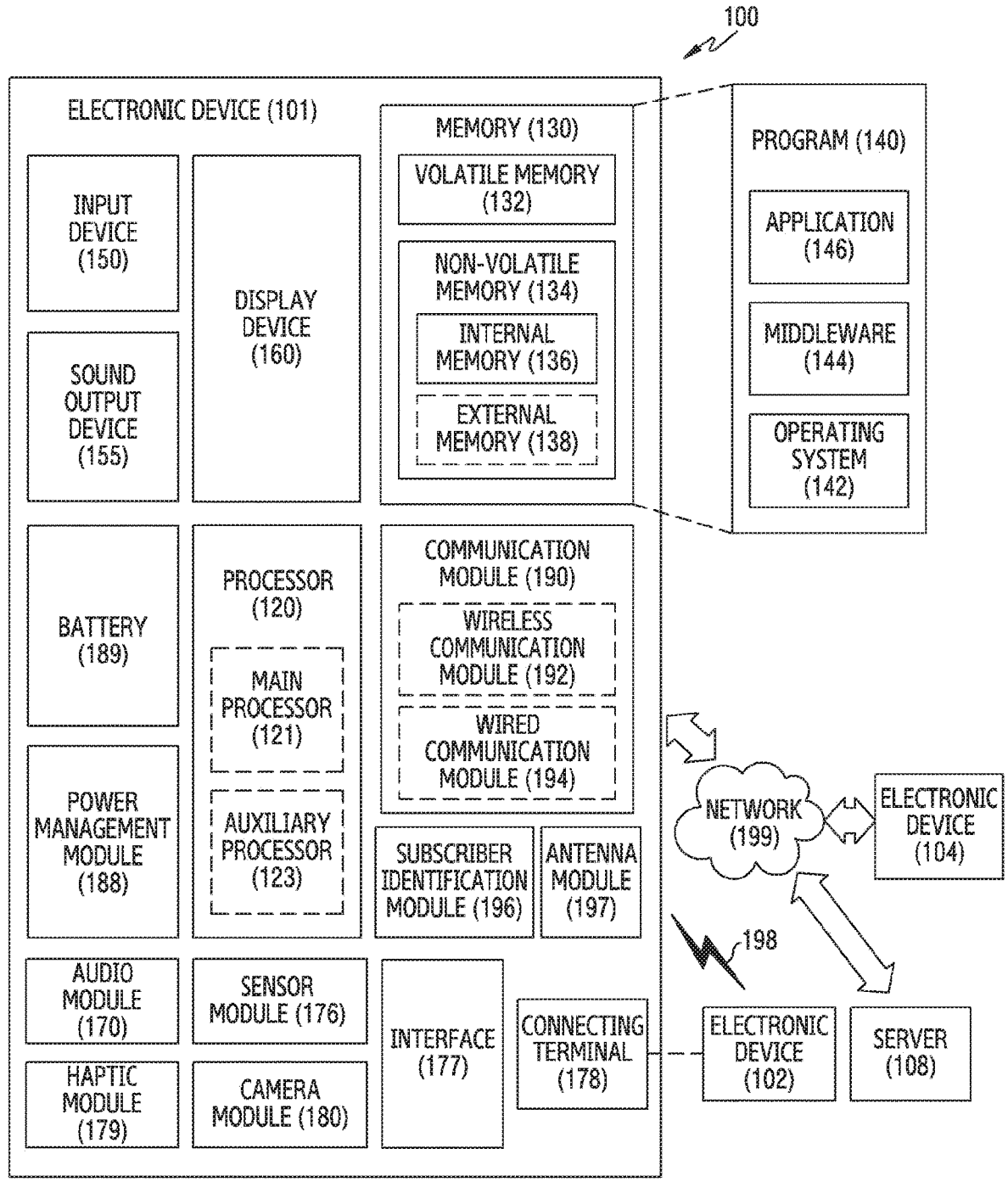
FIG. 1 is a block diagram of an electronic device in a network environment according to various embodiments.

Hereinafter, various embodiments of the present disclosure are described with reference to the accompanying drawings. It should be understood that the embodiment and terms used therein are not to limit the technique disclosed in the present disclosure to particular forms, but to include various modifications, equivalents, and/or alternatives of corresponding embodiments. In describing the drawings, similar reference numerals may be used for similar constituent elements. The expression of the singular form may include the expression of the plural form, unless otherwise dictating clearly in context.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may include one or more antennas for transmitting a signal or power to the outside or receiving it from the outside. According to an embodiment, the communication module 190 (e.g., the wireless communication module 192) may transmit a signal to an external electronic device through an antenna suitable for a communication method, or receive a signal from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the processor 120 may display a graphic user interface (GUI) associated with an electronic card. The processor 120 may detect guide information related to the electronic card, based on a preset condition. The processor 120 may display the graphic user interface associated with the electronic card on the display device 160. The processor 120 may display a card image of the electronic card and at least one icon associated with the guide information related to the electronic card on the graphic user interface. The processor 120 may detect selection of the icon, and display the guide information. The processor 120 may display the guide information, in response to the card image in the graphic user interface.

According to an embodiment, the guide information may include at least one payment event occurring in conducting payment with the electronic card. The processor 120 may detect guide information, based on a payment history according to the use of the electronic card. At this time, the condition may be determined to at least one of a location, a time, a category of the payment event, or a payment pattern of the electronic card user. For example, the guide information may include a map image displaying at least one of the location of the payment event and an payment amount.

According to another embodiment, the guide information may include an item available together with the electronic card. For example, the item may include at least one of a coupon or a membership card. At this time, the condition may be determined to at least one of a current location of the electronic device 101, a current time, or the payment pattern of the electronic card user. The processor 120 may store the item, based on a user request of the electronic device 101. Hence, the processor 120 may perform the electronic payment using the item together with the electronic card.

The electronic device 101 according to various embodiments may include a display device 160, at least one processor 120 operatively connected to the display device 160, and a memory 130 operatively connected to the processor 120.

According to various embodiments, the memory may store instructions for, when executed, causing the processor to detect information related to the electronic card, based on a preset condition, display a graphic user interface to include a first area displaying the electronic card and a second area displaying an icon associated with the information around the first area, detect selection of the icon in the second area, and display the information in the first area.

According to an embodiment, the information may guide at least one payment event generated in performing payment with the electronic card.

According to an embodiment, the condition may be determined to at least one of a location, a time, a category, or a user's payment pattern of the payment event.

According to an embodiment, the instructions may cause the processor to display a location of the payment event on a map image in the first area.

According to an embodiment, the instructions may cause the processor to detect a gesture inputted in the first area, change the graphical user interface to display the payment event, detect selection of one of the payment event, and change the graphical user interface to display payment information of the selected payment event.

According to an embodiment, the instructions may cause the processor to change the graphical user interface to include a third area displaying the location of the payment event on a map image and a fourth area displaying at least part of payment information of the payment event.

According to an embodiment, the instructions may cause the processor to further display an image obtained within a preset period from a time of the payment event in the fourth area.

According to an embodiment, the information may guide an item available together with the electronic card.

According to an embodiment, the condition may be determined to at least one of a current location, a current time, or a user's payment pattern.

According to an embodiment, the instructions may cause the processor to detect a gesture inputted in the first area, and store the item.

A non-transitory computer-readable storage medium according to various embodiments may store one or more programs for detecting information related to the electronic card, based on a preset condition, displaying a graphic user interface to include a first area displaying the electronic card and a second area displaying an icon associated with the information around the first area, detecting selection of the icon in the second area, and displaying the information in the first area.

Figure 2:
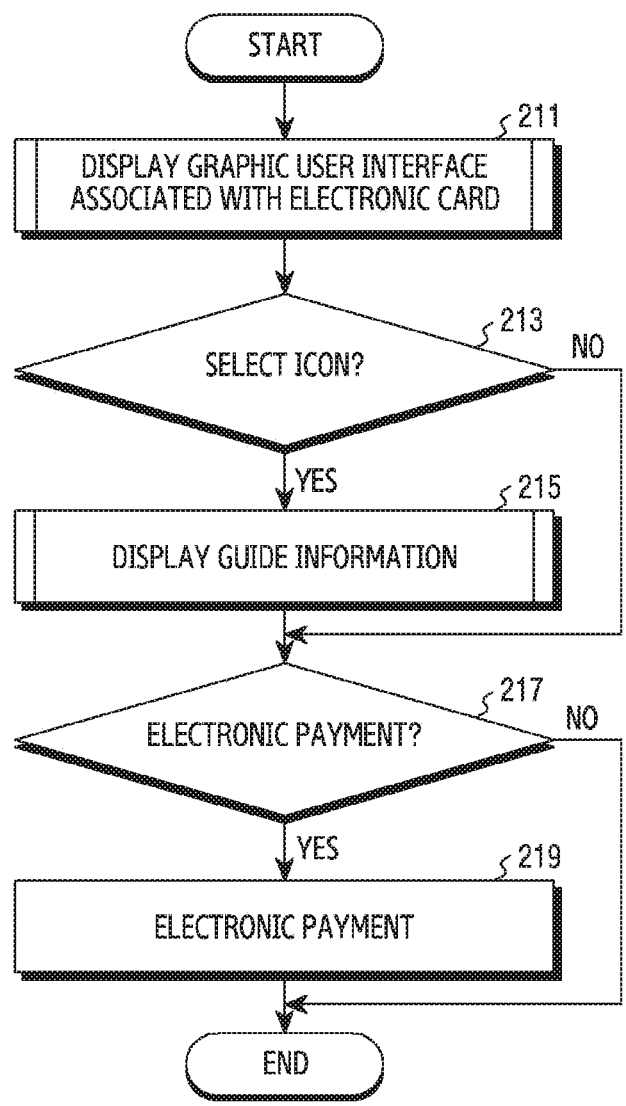
FIG. 2 is a flowchart of an operating method of an electronic device according to various embodiments.

FIG. 2 is a flowchart of an operating method of an electronic device 101 according to various embodiments.

Referring to FIG. 2, the operating method of the electronic device 101 according to various embodiments may start from displaying at the processor 120 a graphic user interface associated with an electronic card in operation 211. The processor 120 may display the graphic user interface associated with the electronic card on the display device 160. The processor 120 may display a card image of the electronic card and at least one icon associated with guide information related to the electronic card on the graphic user interface. The graphic user interface may include a first area displaying the card image and a second area displaying the icon. The second area may be disposed around the first area. For example, the operation of the processor 120 for displaying the graphical user interface shall be described later with reference to FIG. 3.

Figure 3:
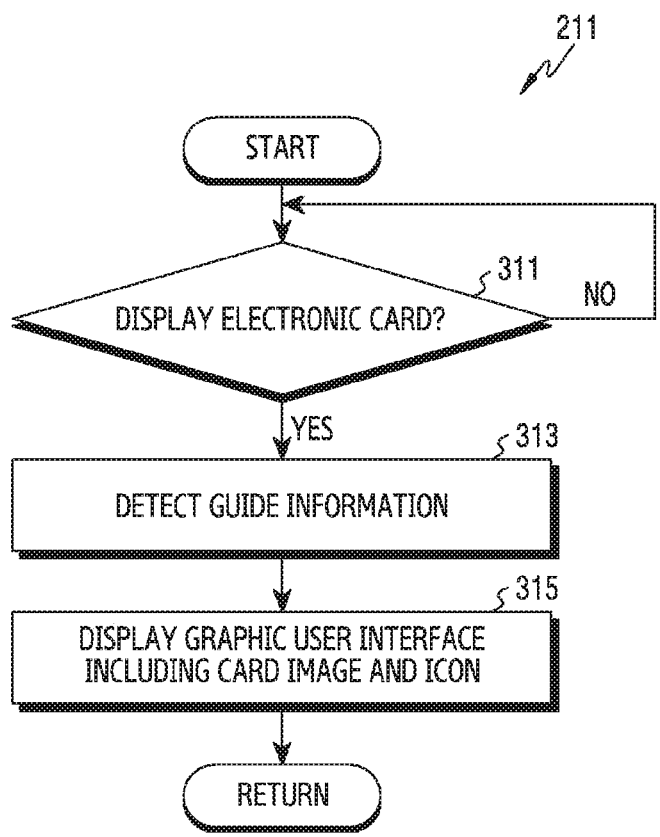
FIG. 3 is a flowchart of a graphic user interface displaying operation in FIG. 2.

FIG. 3 illustrates a flowchart of a graphic user interface displaying operation in FIG. 2.

Referring to FIG. 3, the processor 120 may detect an event for displaying an electronic card in operation 311. According to an embodiment, the processor 120 may detect the event for displaying the electronic card, while the display device 160 is turned off or the display device 160 is turned on to display a home screen or a lock screen. According to another embodiment, the processor 120 may detect the event for displaying the electronic card, while providing a service of an application related to the electronic card through the display device 160. According to other embodiment, the processor 120 may detect the event for displaying the electronic card, while displaying another electronic card. According to other embodiment, the processor 120 may detect the event for displaying the electronic card, while operating to be described. For example, if the display device 160 is a touch screen display, the processor 120 may detect the event for displaying the electronic card from a gesture input received through the touch screen display.

Next, the processor 120 may detect guide information in operation 313. The processor 120 may detect the guide information related to the electronic card, based on a preset condition. The processor 120 may detect the guide information based on the electronic card to display, or may detect the guide information based on another electronic card as well as the electronic card to display. For example, the processor 120 may detect the guide information from content prestored in the memory 130. As another example, the processor 120 may request guide information from the external device 102, 104, and 108, and accordingly receive the guide information from the external device 102, 104, and 108. As another example, the processor 120 may detect the guide information from content received from the external device 102, 104, and 106.

According to an embodiment, the processor 120 may detect at least one payment event generated by performing payment with the electronic card as guide information. For doing so, the processor 120 may detect the guide information, based on a payment history according to the use of the electronic card. At this time, the condition may be determined to at least one of a location, a time, a category of the payment event, or a payment pattern of the electronic card user.

For example, based on the condition, the processor 120 may classify a plurality of payment events to a plurality of groups in the payment history, and detect at least one of the groups as the guide information. For example, the processor 120 may classify the payment events in the payment history to a first region, for example, Seoul and a second region, for example, Jeju Island, based on locations of the payment events. If the number of payment events in the first region exceeds the number of payment events in the second region, the processor 120 may detect a payment event in the second region. As another example, the processor 120 may classify payment events in the payment history to weekdays, weekends, holidays, for example, Christmas, based on the time of the payment events. The processor 120 may detect a payment event of a holiday. As another example, the processor 120 may classify payment events to shopping, culture, cafe, restaurant, transportation, and the like, based on categories of the payment events in the payment history. The processor 120 may detect at least one payment event of the categories, based on at least one of the number of the payment events of each category or the time of the payment event.

According to another embodiment, the processor 120 may detect an item available with the electronic card as the guide information. For example, the item may include at least one of a coupon or a membership card. At this time, the condition may be determined to at least one of the current location of the electronic device 101, the current time, or the payment pattern of the electronic card user.

For example, the processor 120 may assign priorities to a plurality of items, based on condition, and detect at least one of the items as the guide information, based on the priority. For example, the processor 120 may assign the priorities to the items, based on a distance between the current location of the electronic device 101 and available locations of the items. The processor 120 may detect the item, in ascending order of the distance between the current location of the electronic device 101 and the available locations of the items. As another example, the processor 120 may assign priorities to the items, based on a difference value between the current time of the electronic device 101 and available times of the items. The processor 120 may detect the item, in ascending order of the difference value between the current time of the electronic device 101 and the available times of the items. As another example, the processor 120 may assign priorities to the items, based on locations or brands of payment events in the payment history. That is, based on the locations or the brands of the payment events, the processor 120 may classify the payment events to a plurality of groups and assign priorities to the groups according to the number of the payment events for each group. The processor 120 may compare the locations or the brands of the groups with the available locations of the items, and assign priorities of the groups as the priorities of the items. The processor 120 may detect the items, in descending order of the number of the payment events per group.

Next, the processor 120 may display a graphic user interface including a card image of the electronic card and an icon in operation 315. For example, the electronic card may include a payment card available for the payment or a dummy card unavailable for the payment. Herein, the card image of the payment card may be provided by a card company, and may be represented identically to a plastic card issued by the card company. The graphic user interface may include a first area displaying the card image and a second area displaying the icon. The second area may be disposed around the first area. The second area may include at least part of a peripheral area of the first area. For example, the icon may be formed in at least one of a speech balloon, text, a button, an overlapping card, or a tab. Next, the processor 120 may return to FIG. 2.

According to various embodiments, the processor 120 may detect selection of the icon in operation 213. The processor 120 may detect the selection of the icon in the second area of the graphical user interface. For example, if the display device 160 is a touch screen display, the processor 120 may detect the selection of the icon from a gesture input received through the touch screen display. In response to this, the processor 120 may display guide information in operation 215. The processor 120 may display the guide information in the first area of the graphic user interface. The processor 120 may remove the icon from the second area, while displaying the guide information in the first area. For example, the operation for displaying the guide information at the processor 120 shall be described later with reference to FIG. 4, FIG. 5, FIG. 6, FIG. 7, FIG. 8, FIG. 9 and FIG. 10.

Figure 4:
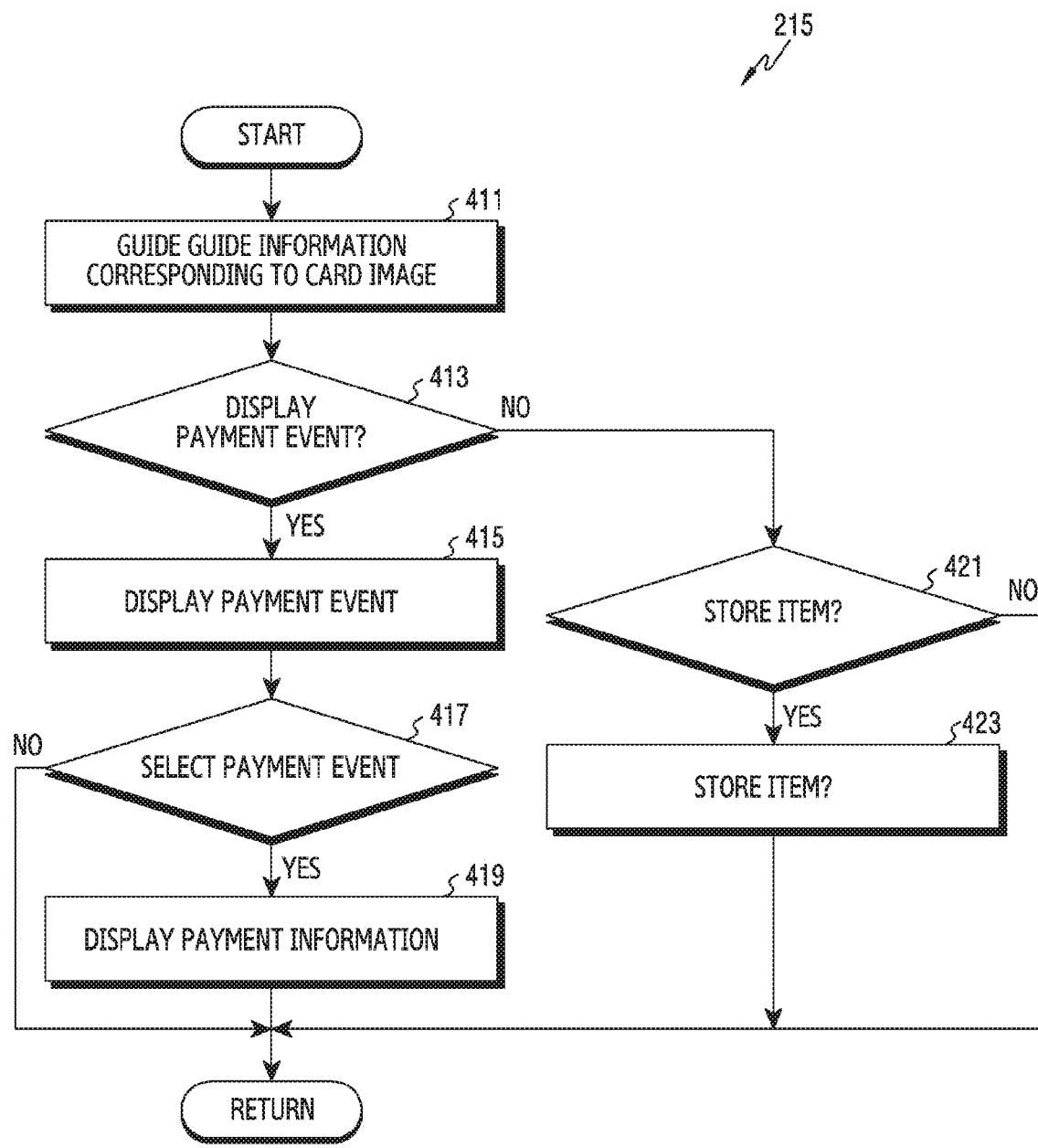
FIG. 4 is a flowchart of a guide information displaying operation in FIG. 2.

FIG. 4 is a flowchart of a guide information displaying operation in FIG. 2. FIG. 5, FIG. 6 and FIG. 7 illustrate exemplary diagrams for explaining a guide information displaying operation according to an embodiment. FIG. 8, FIG. 9 and FIG. 10 illustrate exemplary diagrams for explaining a guide information displaying operation according to another embodiment.

Referring to FIG. 4, the processor 120 may display guide information corresponding to a card image in operation 411. That is, the processor 120 may display the guide information in a first area of a graphic user interface associated with an electronic card. For example, the processor 120 may display the guide information superimposed on the card image in the first area. As another example, the processor 120 may provide an effect of reversing the card image to display the back of the card image in the first area, and display the guide information on the back of the card image. As another example, the processor 120 may change and display the card image with the guide information in the first area.

According to an embodiment, the processor 120 may display at least one payment event generated by the payment with the electronic card as the guide information in operation 411. The processor 120 may display a payment event detected based on a preset condition as the guide information. At this time, the condition may be determined to at least one of a location, a time, a category of the payment event, or a payment pattern of the electronic card user.

For example, the processor 120 may display an electronic card, for example, a card image 521 of AAA, in a first area 520 in a graphic user interface 510, and display an icon 531 associated with the payment event related to a specific category, for example, shopping in a second area 530 as shown in FIG. 5A. For example, the processor 120 may display the icon 531 in the form of a speech balloon. The processor 120 may detect selection of the icon 531 in the second area 530, and display guide information 523 superimposed on the card image 521 in the first area 520 as shown in FIG. 5B. In response to this, the processor 120 may remove the icon 531 from the second area 530. The guide information 523 may include at least one of a map image 525 displaying at least one of a location of the payment event and a payment amount or a button 527 for displaying the payment event in more detail. For example, the map image 525 may be determined to a regional range covering the location of the payment event.

Figures 6A, 6B:
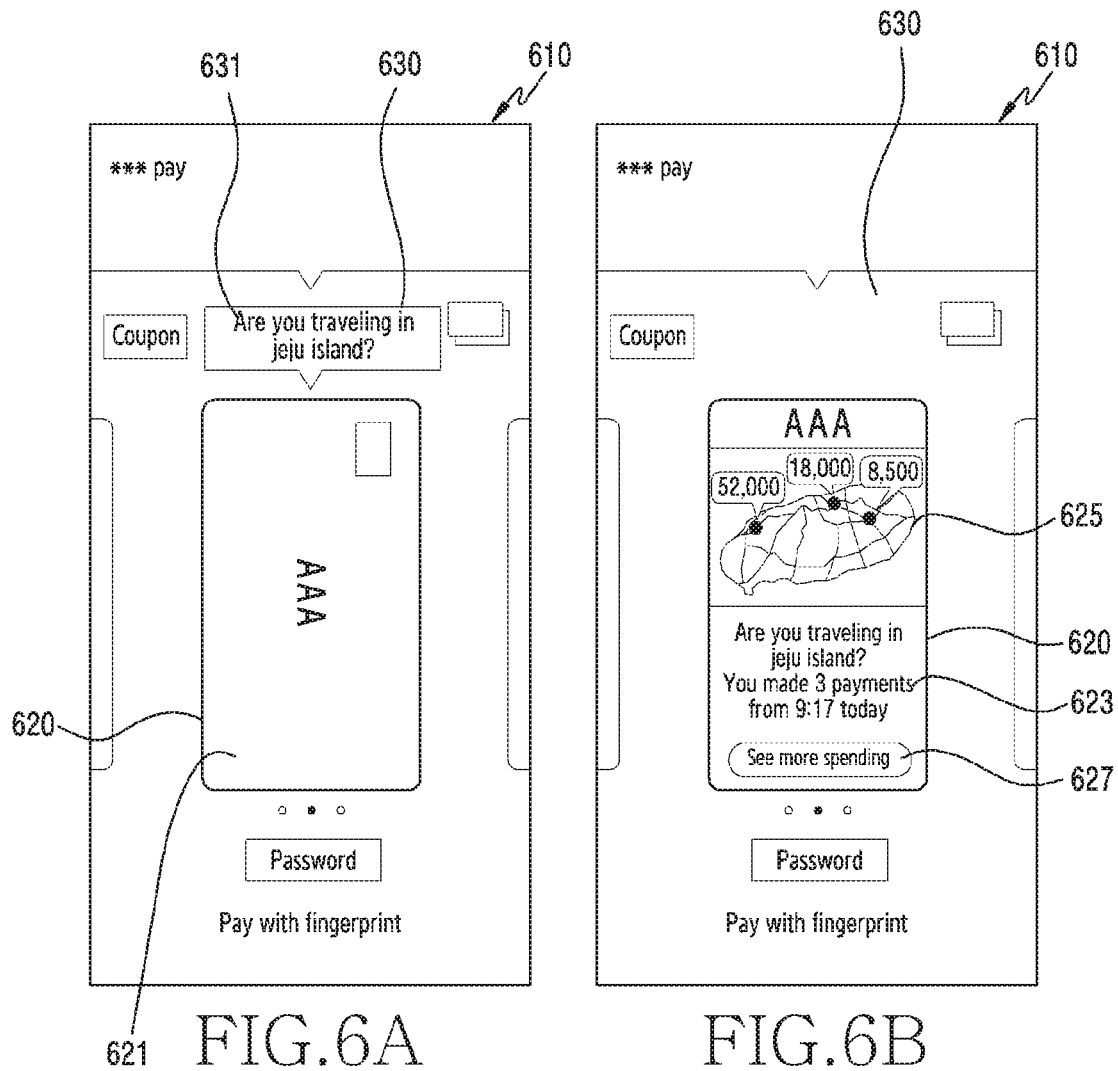

As another example, the processor 120 may display the electronic card, for example, a card image 621 of AAA, in a first area 620 in a graphical user interface 610, and display an icon 631 associated with a payment event related to a specific region, for example, Jeju Island, in a second area 630 as shown in FIG. 6A. For example, the processor 120 may display the icon 631 in the form of the speech balloon. The processor 120 may detect selection of the icon 631 in the second area 630, and superimpose and display guide information 623 on the card image 621 in the first area 620 as shown in FIG. 6B. In response to this, the processor 120 may remove the icon 631 from the second area 630. The guide information 623 may include at least one of a map image 625 of a specific region, for example, Jeju Island, displaying at least one of a payment event location and a payment amount, or a button 627 for displaying the payment event in more detail.

According to an embodiment, the processor 120 may detect an event for displaying the payment event in operation 413. For example, if the display device 160 is a touch screen display, the processor 120 may detect the event for displaying the payment event from a gesture input received through the touch screen display. In response to this, the processor 120 may change the graphical user interface to display the payment event in operation 415. The processor 120 may display at least part of payment information of the payment event.

Figure 7A:
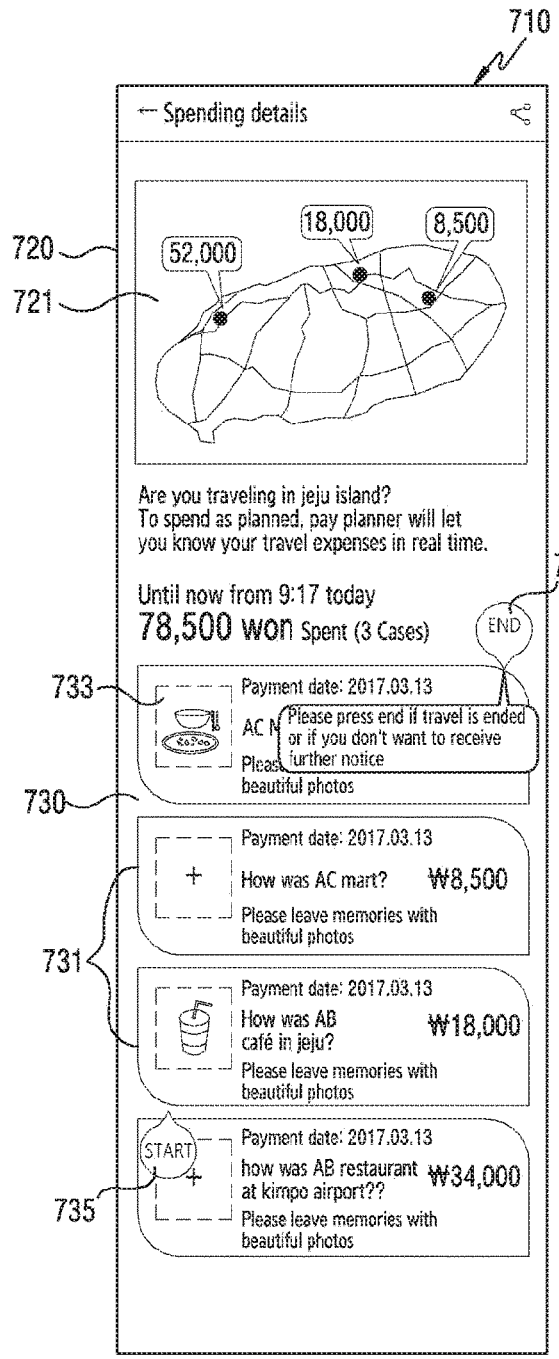

For example, the processor 120 may detect a gesture input received in the first area 620 through the touch screen display, and change the graphical user interface 610 as shown in FIG. 7A. That is, the processor 120 may change from the graphic user interface 610 associated with the electronic card, for example, the first graphic user interface 710 to a graphic user interface 710 associated with a payment event 731, for example, the second graphic user interface 710. The second graphical user interface 710 may include at least one of a third area 720 or a fourth area 730. The processor 120 may display a map image 721 of a specific region, for example, Jeju Island, displaying at least one of the location of the payment event 731 and the payment amount in the third region 720. The processor 120 may display the payment event 731 as a list in the fourth area 730.

Figure 7B:
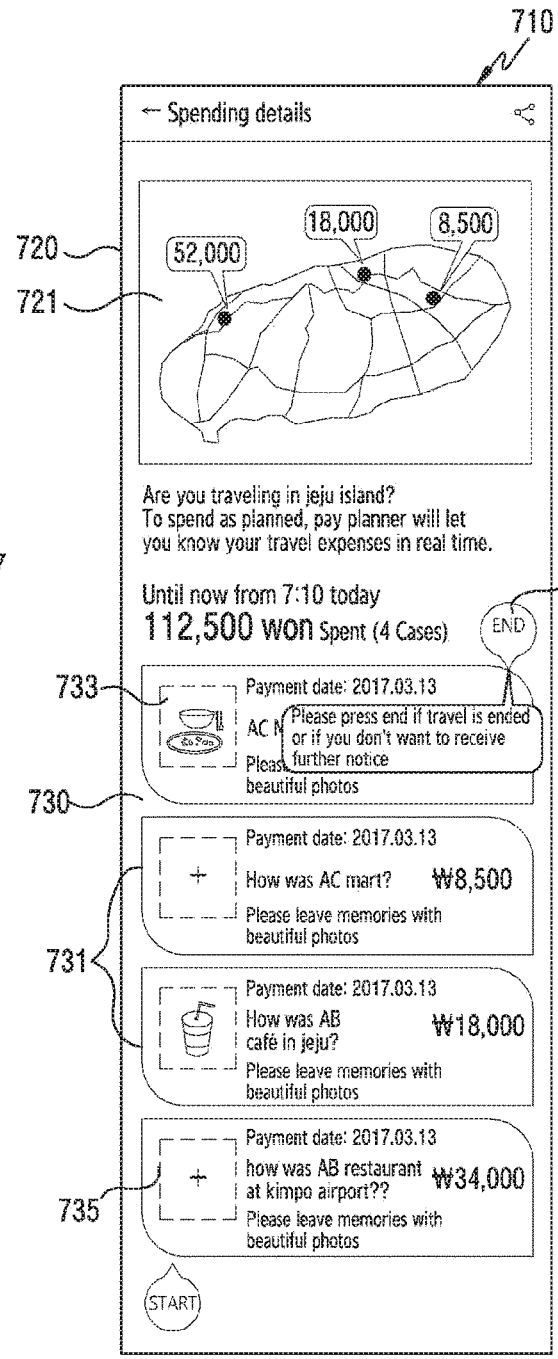

For example, the processor 120 may display at least part of the payment information, in response to each payment event 731 in the fourth area 730. The processor 120 may further display a reference image 733, in response to each payment event 731 in the fourth area 730. For doing so, the processor 120 may select any one of an image acquired at the electronic device 101, for example, an image stored in the memory 130, a captured image captured through the camera module 180, or a received image received through the communication module 190 as a reference image 733. For example, the processor 120 may select a stored image captured or received within a preset period from the time of each payment event 731 as the reference image 733. That is, the processor 120 may select a stored image photographed or received at the closest time to the time of each payment event 731 as the reference image 733. As another example, the processor 120 may select any one of the stored image, the captured image or the received image as the reference image 733, based on user selection of the electronic device 101. The processor 120 may further display a start indicator 735 and an end indicator 737 in the fourth area 730. The start indicator 735 and the end indicator 737 may indicate a range of the payment event belonging to the guide information. The processor 120 may move at least one of the start indicator 735 or the end indicator 737 by the user of the electronic device 101 as shown in FIG. 7B. Thus, the processor 120 may adjust the range of the payment event belonging to the guide information.

According to an embodiment, the processor 120 may detect selection of the payment event in operation 417. For example, if the display device 160 is a touch screen display, the processor 120 may detect the selection of the payment event from a gesture input received through the touch screen display. In response to this, the processor 120 may change the graphical user interface to display payment information of the selected payment event in operation 419. For example, the processor 120 may detect at least part of the payment information from content prestored in the memory 130. As another example, the processor 120 may request at least part of the payment information from the external device 102, 104, and 108, and accordingly receive at least part of the payment information from the external device 102, 104, and 108. Next, the processor 120 may return to FIG. 2.

For example, the processor 120 may detect a gesture input received in any one of the third area 720 or the fourth area 730 through the touch screen display, and change the graphical user interface 710 as shown in FIG. 8A. That is, the processor 120 may change from the graphical user interface 710 associated with the payment event 731, for example, the second graphical user interface 710 to a graphical user interface 810 associated with the payment information, for example, the third graphical user interface 810. The payment information is information related to a place, for example, AB cafe where the payment is made with the electronic card, for example, the AAA card, and may include at least one of place information for identifying the corresponding place, history information indicating a payment history performed from the past at the place or reference information related to the corresponding place. The reference information may include at least one of recommendation information on a similar place derived from the corresponding place or evaluation information on the corresponding place, and the evaluation information may be generated by at least one of the user or other of the electronic device 101. The third graphical user interface 810 may include at least one of a fifth area 820 for displaying the place information, a sixth area 830 for displaying the history information or a seventh area 840 for displaying the reference information.

For example, the fifth area 820 may include an evaluation area 821 for the user of the electronic device 101 to evaluate the place. For example, the processor 120 may detect a gesture input received in the evaluation area 821 through the touch screen display, and change the graphical user interface 810 as shown in FIG. 8B. That is, the processor 120 may change from the graphic user interface 810 associated with payment information, for example, the third graphical user interface 810, to a graphical user interface 860 associated with the place evaluation, for example, the fourth graphical user interface 860. The processor 120 may input an evaluation for the place through the fourth graphical user interface 860, based on a user request. The processor 120 may further input a reference image corresponding to the place through the fourth graphic user interface 860. For doing so, the processor 120 may select one of the stored image, the captured image or the received image as the reference image, based on the user selection of the electronic device 101.

According to an embodiment, if not detecting the selection of the payment event in operation 417, the processor 120 may return to FIG. 2. That is, the processor 120 may not display the payment information of the payment event.

According to another embodiment, the processor 120 may display an item available with the electronic card as guide information in operation 411. The processor 120 may display the item detected based on a preset condition as the guide information. At this time, the condition may be determined to at least one of the current location of the electronic device 101, the current time or the payment pattern of the electronic card user.

According to another embodiment, the processor 120 may detect an event for storing the item in operation 421. For example, if the display device 160 is the touch screen display, the processor 120 may detect an event for displaying the payment event from a gesture input received through the touch screen display. In response to this, the processor 120 may store the item in operation 423. Next, the processor 120 may return to FIG. 2.

Figure 9A:
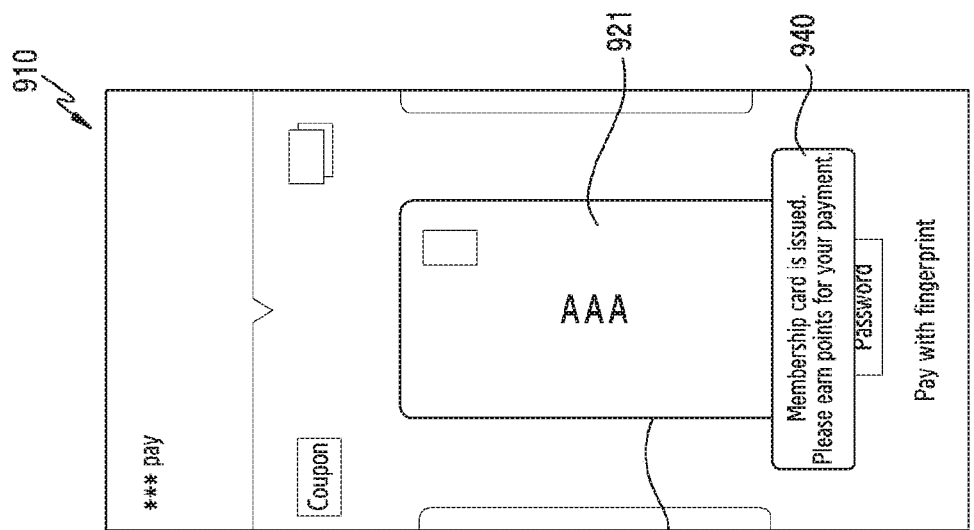
Figure 9B:
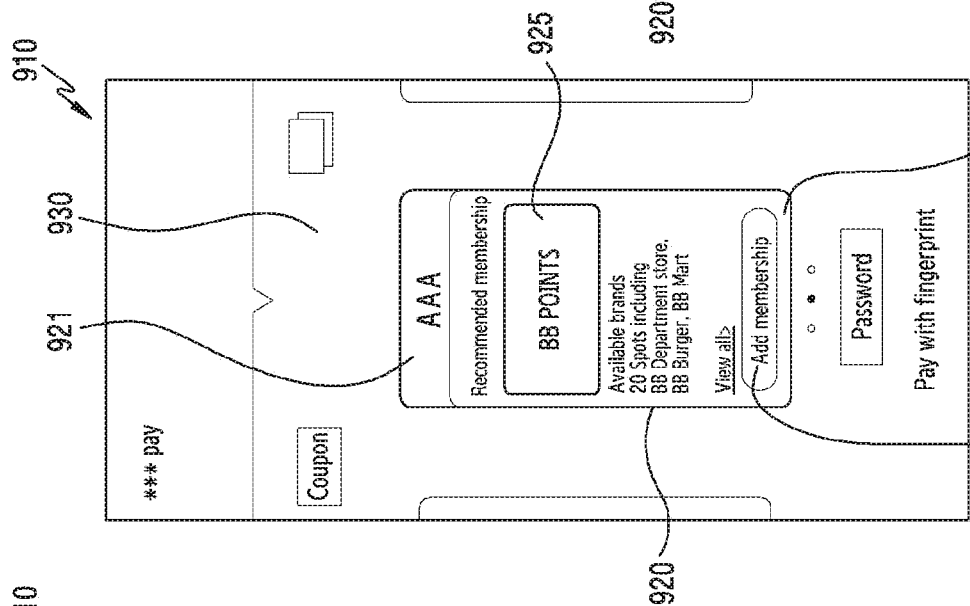
Figure 9C:
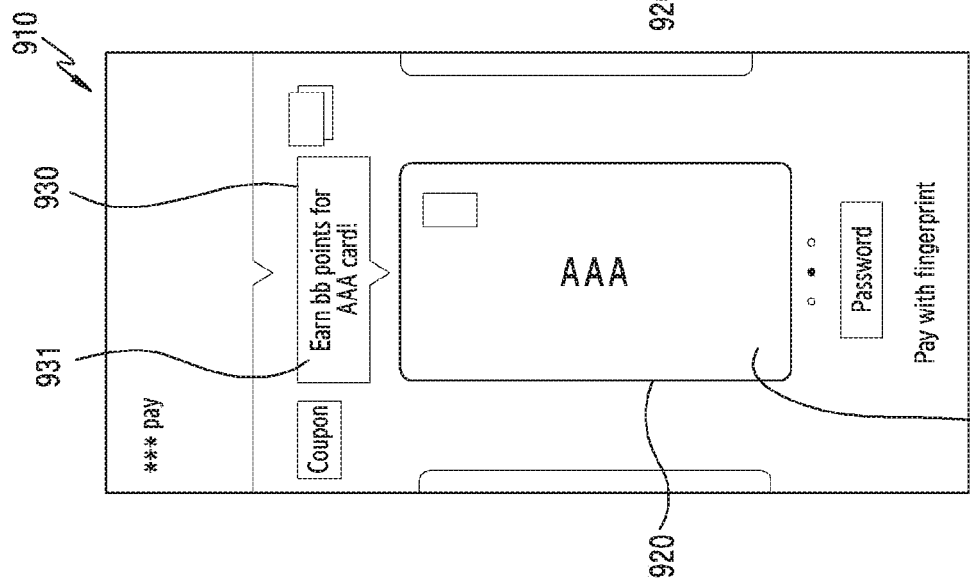

For example, the processor 120 may display the electronic card, for example, a card image 921 of AAA, in a first area 920 in a graphic user interface 910, and display an item 931 available with the electronic card, for example, an icon 931 associated with a membership card in the second area 930 as shown in FIG. 9A. For example, the processor 120 may display the icon 931 in the form of a button. The processor 120 may detect selection of the icon 931 in the second area 930, and superimpose and display guide information 923 on the card image 921 in the first area 920 as shown in FIG. 9B. For example, the processor 120 may display the rest of the card image 921 together with the guide information 923, by superimposing the guide information 923 on part of the card image 921 in the first area 920. In response to this, the processor 120 may remove the icon 931 from the second region 930. The guide information 923 may include at least one of an item image 925 of the item, for example, the membership card, or a button 927 for storing the item, for example, the membership card. Next, the processor 120 may detect a gesture input received in the first area 920 through the touch screen display, and store the item, for example, the membership card. Herein, the processor 120 may display a notification message 940 of storing the item, for example, the membership card in the graphical user interface 910 as shown in FIG. 9C.

As another example, the processor 120 may display the electronic card, for example, a card image 1021 of AAA, in a first area 1020 in a graphical user interface 1010, and display an icon 1031 associated with a specific item, for example, a coupon in a second area 1030 as shown in FIG. 10A. For example, the processor 120 may display the icon 1031 in the form of an overlapping card superimposed on the card image 1021. The processor 120 may detect selection of the icon 1031 in the second area 1030, and superimpose and display guide information 1023 on the card image 1021 in the first area 1020 as shown in FIG. 10B. For example, the processor 120 may display the rest of the card image 1021 together with the guide information 1023, by superimposing the guide information 1023 on part of the card image 1021 in the first area 1020. The guide information 1023 may include at least one of an item image 1025 of the item, For example, a coupon, or a button 1027 for storing the item, for example, the coupon. Next, the processor 120 may detect a gesture input received from the first area 1020 through the touch screen display, and store the item, for example, the coupon. Herein, the processor 120 may display a notification message 1040 of storing the item, for example, the coupon, in the graphical user interface 1010 as shown in FIG. 10C.

According to another embodiment, if not detecting the event for displaying the payment event in operation 413 and not detecting the event for storing the item in operation 421, the processor 120 may return to FIG. 2. That is, the processor 120 may not display the payment event, or store the item.

According to various embodiments, the processor 120 may detect an event for performing the electronic payment in operation 217. While displaying the graphical user interface associated with the electronic card, the processor 120 may perform an authentication procedure on the user of the electronic device 101. While displaying the graphical user interface associated with the electronic card in operation 211, the processor 120 may perform the authentication procedure even though the selection of the icon is not detected in operation 213. Alternatively, the processor 120 may detect the selection of the icon in operation 213, and perform the authentication procedure, while displaying the guide information in the graphic genetic interface in operation 215. For example, the processor 120 may perform the authentication procedure, based on at least one of biometric information detected through the biometric sensor of the sensor module 176 or a secret key detected through the input device 150. If the authentication is successful, the processor 120 may detect the event for performing the electronic payment. In response to this, the processor 120 may perform the electronic payment using the electronic card in operation 219. Thus, the operating method of the electronic device 101 according to various embodiments may be finished. For example, the operation for the processor 120 to perform the electronic payment shall be described later with reference to FIG. 11.

FIG. 11 illustrates exemplary diagrams for explaining an electronic payment operation in FIG. 2.

For example, the processor 120 may detect success of the authentication on the user of the electronic device 101, and change the graphical user interface 1010 as shown in FIG. 11A. That is, the processor 120 may change from the graphical user interface 1010 associated with the electronic card, for example, from a first graphical user interface to a graphical user interface 1110 associated with the electronic payment, for example, to the fifth graphical user interface 1110. The fifth graphical user interface 1110 may include an eighth area 1120 and a ninth area 1130, and the ninth area 1130 may surround the eighth area 1120. The processor 120 may display a card image 1121 in the eighth area 1120, and display at least one of a first icon 1131 for calling a stored coupon in the ninth area 1130, a second icon 1133 for calling the stored membership card or a third icon 1135 indicating a user signature generated and stored by the user of the electronic device 101.

For example, the processor 120 may detect selection of the first icon 1131 in the ninth area 1130, and display the stored coupon in the ninth area 1130 as shown in FIG. 11B. The processor 120 may display a coupon available with the electronic card. The processor 120 may display the stored coupon in operation 215. Thus, the processor 120 may perform electronic payment using the coupon together with the electronic card. That is, the processor 120 may transmit card information of the electronic card and identification information of the coupon. Alternatively, while displaying the coupon, the processor 120 may detect reselection of the first icon 1131 in the ninth area 1130, and remove the coupon from the ninth area 1130 as shown in FIG. 11C. Hence, the processor 120 may perform the electronic payment using the electronic card, without using the coupon. That is, the processor 120 may transmit the card information of the electronic card.

Likewise, the processor 120 may detect selection of the second icon 1133 in the ninth area 1130, and display the stored membership card in the ninth area 1130. The processor 120 may display the membership card available with the electronic card. The processor 120 may display the stored membership card in operation 215. Thus, the processor 120 may perform electronic payment using the membership card together with the electronic card. That is, the processor 120 may transmit the card information of the electronic card and identification information of the membership card. Alternatively, while displaying the membership card, the processor 120 may detect reselection of the second icon 1133 in the ninth area 1130, and remove the membership card from the ninth area 1130. Hence, the processor 120 may perform the electronic payment using the electronic card, without using the membership card. That is, the processor 120 may transmit the card information of the electronic card.

According to various embodiments, even if the event for performing the electronic payment is not detected in operation 217, the operating method of the electronic device 101 according to various embodiments may be finished. While detecting the selection of the icon in operation 213, and displaying the guide information in the graphic genetic interface in operation 215, the operating method of the electronic device 101 according to various embodiments may be finished.

An operating method of an electronic device 101 according to various embodiments may include detecting information related to an electronic card, based on a preset condition, displaying a graphic user interface to include a first area displaying the electronic card and a second area displaying an icon associated with the information around the first area, detecting selection of the icon in the second area, and displaying the information in the first area.

According to an embodiment, the information may guide at least one payment event generated in performing payment with the electronic card.

According to an embodiment, the condition may be determined to at least one of a location, a time, a category, or a user's payment pattern of the payment event.

According to an embodiment, displaying the information in the first area may include displaying a location of the payment event on a map image in the first area.

According to an embodiment, the method may include detecting a gesture inputted in the first area, changing the graphical user interface to display the payment event, detecting selection of one of the payment event, and changing the graphical user interface to display payment information of the selected payment event.

According to an embodiment, changing the graphical user interface to display the payment information may include changing the graphical user interface to include a third area displaying the location of the payment event on a map image and a fourth area displaying at least part of payment information of the payment event.

According to an embodiment, the fourth area may further display an image obtained within a preset period from a time of the payment event.

According to an embodiment, the information may guide an item available together with the electronic card.

According to an embodiment, the condition may be determined to at least one of a current location, a current time, or a user's payment pattern.

According to an embodiment, the method may further include detecting a gesture inputted in the first area and storing the item.

According to various embodiments, the electronic device 101 may provide additional information related to the electronic card, while displaying the graphic user interface associated with the electronic card. That is, the electronic device 101 may detect the additional information associated with the electronic card, and thus display the additional information, without switching the graphical user interface. Hence, the user of the electronic device 101 may easily obtain useful additional information, without directly retrieving it. Therefore, in using the electronic device 101, user convenience may be improved, and further, use efficiency of the electronic device may be improved.

The invention claimed is:

1. An electronic device comprising:
a display device;
at least one processor operatively connected to the display device; and
a memory operatively connected to the processor,
wherein the memory stores instructions for, when executed, causing the processor to:
detect information related to an electronic card, based on a preset condition,
display a graphic user interface (GUI) comprising a first area displaying the electronic card and a second area displaying an icon associated with the information around the first area,
detect selection of the icon in the second area, and
in response to the selection of the icon, display the information superimposed on the electronic card in the first area,
wherein the information comprises a map image displaying payment amount of at least one payment event occurred in conducting payment with the electronic card.

2. The electronic device of claim 1, wherein the preset condition is determined to be at least one of a location, a time, a category, or a user's payment pattern of the at least one payment event.

3. The electronic device of claim 1, wherein the instructions cause the processor to display a location of the at least one payment event on the map image in the first area.

4. The electronic device of claim 3, wherein the instructions cause the processor to:
detect a gesture inputted in the first area,
change the GUI to display the at least one payment event,
detect selection of one payment event of the at least one payment event, and
change the GUI to display payment information of the selected payment event.

5. The electronic device of claim 4, wherein the instructions cause the processor to:
change the GUI to include:
a third area displaying the location of the at least one payment event on the map image, and
a fourth area displaying at least part of payment information of the at least one payment event.

6. The electronic device of claim 5, wherein the instructions cause the processor to:
further display an image obtained within a preset period from a time of display of the at least one payment event in the fourth area.

7. The electronic device of claim 1, wherein the information further comprises an item available together with the electronic card.

8. The electronic device of claim 7, wherein the preset condition is determined to be at least one of a current location, a current time, or a user's payment pattern.

9. The electronic device of claim 7, wherein the instructions cause the processor to:
detect a gesture inputted in the first area, and
store the item.

10. An operating method of an electronic device, comprising:
detecting information related to an electronic card, based on a preset condition;
displaying a graphic user interface (GUI) comprising a first area displaying the electronic card and a second area displaying an icon associated with the information around the first area;
detecting selection of the icon in the second area; and
in response to the selection of the icon, displaying the information superimposed on the electronic card in the first area,
wherein the information comprises a map image displaying payment amount of at least one payment event occurred in conducting payment with the electronic card.

11. The method of claim 10, wherein the preset condition is determined to be at least one of a location, a time, a category, or a user's payment pattern of the at least one payment event.

12. The method of claim 10, wherein displaying the information in the first area comprises:
displaying a location of the at least one payment event on the map image in the first area.

13. The method of claim 12, comprising:
detecting a gesture inputted in the first area;
changing the GUI to display the at least one payment event;
detecting selection of one payment event of the at least one payment event; and
changing the GUI to display payment information of the selected payment event.

14. The method of claim 13, wherein changing the GUI to display the payment information comprises:
changing the GUI to include:
a third area displaying a location of the at least one payment event on the map image, and
a fourth area displaying at least part of payment information of the at least one payment event.

15. The method of claim 14, wherein the fourth area further displays an image obtained within a preset period from a time of the at least one payment event.

16. The method of claim 10, wherein the information further comprises an item available together with the electronic card.

17. The method of claim 16, wherein the preset condition is determined to be at least one of a current location, a current time, or a user's payment pattern.

18. The method of claim 16, further comprising:
detecting a gesture inputted in the first area; and
storing the item.

* * * * *